United States Patent
Poast et al.

(10) Patent No.: US 7,024,908 B2
(45) Date of Patent: Apr. 11, 2006

(54) FATIGUE ENHANCEMENT OF MATERIAL SURROUNDING OPENINGS IN WORKPIECES

(75) Inventors: Tom G. Poast, Seattle, WA (US); Charles M. Copple, Kent, WA (US); Jude H. Restis, Kent, WA (US)

(73) Assignee: Fatigue Technology, Inc., Seattle, WA (US)

( * ) Notice: Subject to any disclaimer, the term of this patent is extended or adjusted under 35 U.S.C. 154(b) by 329 days.

(21) Appl. No.: 10/619,226

(22) Filed: Jul. 10, 2003

(65) Prior Publication Data

US 2005/0005669 A1 Jan. 13, 2005

(51) Int. Cl.
B21D 39/08 (2006.01)
(52) U.S. Cl. .................... 72/391.2; 72/370.07
(58) Field of Classification Search ............. 72/370.07, 72/391.2
See application file for complete search history.

(56) References Cited

U.S. PATENT DOCUMENTS

| 4,583,388 A | 4/1986 | Hogenhout | 72/393 |
|---|---|---|---|
| 4,597,282 A | 7/1986 | Hogenhout | 73/370 |
| 4,665,732 A | 5/1987 | Hogenhout | 72/393 |
| 4,885,829 A | 12/1989 | Landy | 29/156.8 R |
| 4,989,442 A | 2/1991 | Rosier | 72/391.2 |
| 5,127,254 A | 7/1992 | Copple et al. | 72/370 |
| 5,305,627 A | 4/1994 | Quincey et al. | 72/370 |
| 5,943,898 A | 8/1999 | Kuo | 72/370.07 |

Primary Examiner—Lowell A. Larson
(74) Attorney, Agent, or Firm—Seed IP Law Group PLLC

(57) ABSTRACT

An elongated first tubular member has a mandrel receiving center passageway and a slotted outer end portion that comprises first axial fingers separated by first axial slots. An elongated second tubular member surrounds the first tubular member and has a slotted outer end portion that comprises second axial fingers separated by second axial slots. An elongated third tubular member surrounds the second tubular member and has a slotted outer end portion comprising third axial fingers separated by third axial slots. An elongated mandrel is positioned inside the center passageway. The first tubular member is extendable and retractable longitudinally of the second and third tubular members. A tubular sleeve is provided that has an inner end and a flange projecting radially outwardly from the sleeve at the inner end. The mandrel is extendable axially through the center passageway of the first tubular member and axially through the tubular sleeve when the radial flange is clamped by and between the first and second fingers.

18 Claims, 13 Drawing Sheets

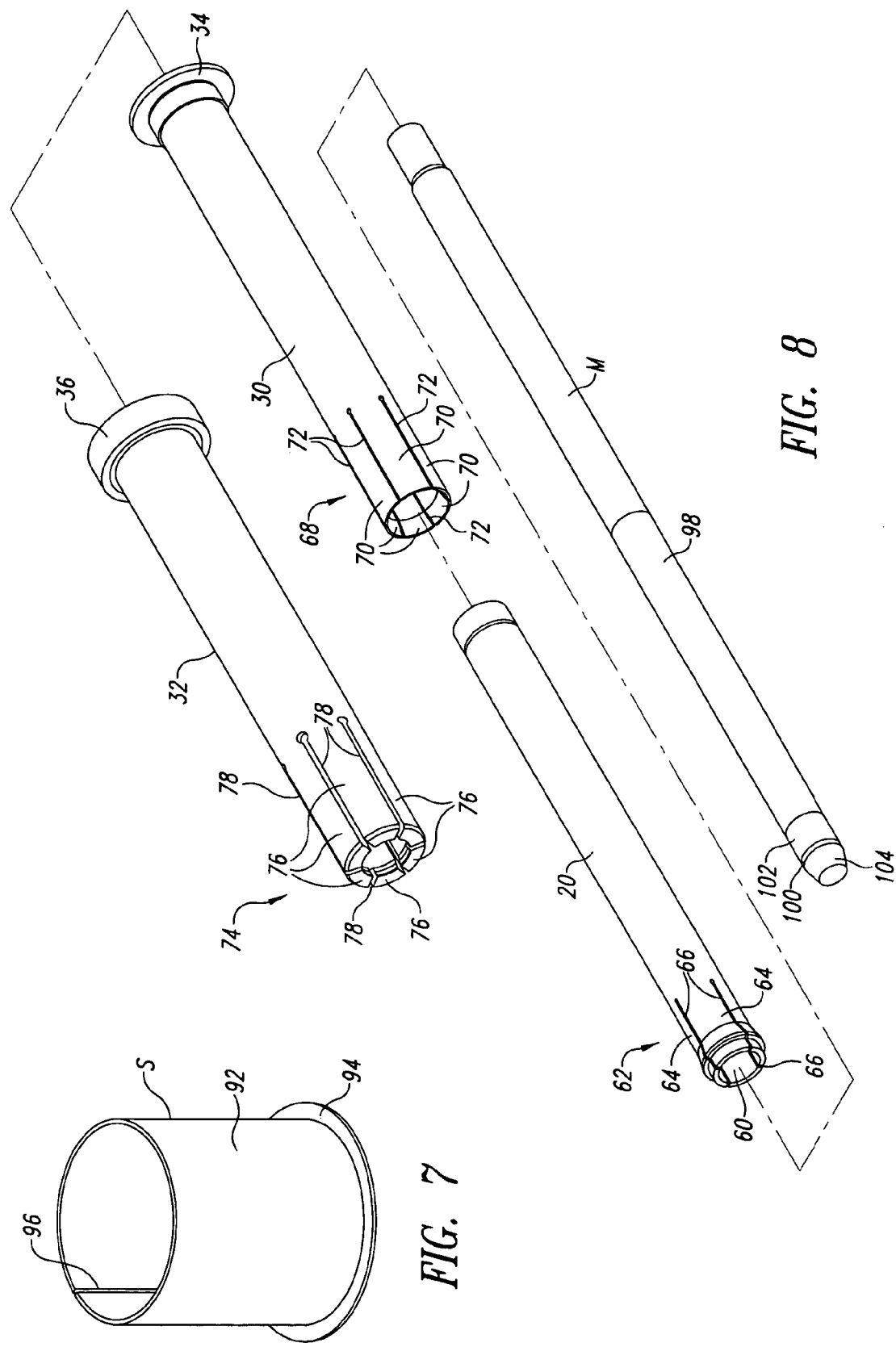

FATIGUE ENHANCEMENT OF MATERIAL SURROUNDING OPENINGS IN WORKPIECES

TECHNICAL FIELD

This invention relates to split sleeve cold expansion of material surrounding openings in the material, for fatigue life enhancement of the material. More particularly, it relates to the provision of a tool adapted for easy insertion of a split sleeve into an opening in a workpiece by extension of the tool, and the pulling of a mandrel through the split sleeve to expand the split sleeve and the material surrounding the split sleeve, and the removal of the split sleeve from the opening following expansion by a retraction of the tool away from the workpiece.

BACKGROUND OF THE INVENTION

Split sleeve cold expansion of fastener holes and other openings in structural members is a process in which a tapered mandrel is used in conjuction with a disposable, internally lubricated split sleeve, to compressively pre-stress a significant zone in the material, surrounding the opening. The compressive pre-stressing offsets the stress concentrations of the hole itself to produce substantial improvement in structural fatigue performance of the material in which the opening is formed. Systems for installing and removing the sleeve from the workpiece, by use of the same tooling that pulls a mandrel through the sleeve for expanding the sleeve and the opening in the workpiece are, for example, disclosed by U.S. Pat. No. 5,127,257, granted Jul. 7, 1992, and by U.S. Pat. No. 5,305,627, granted Apr. 26, 1994. The present invention constitutes an improvement on the systems disclosed by these patents.

The above patents and the additional patents listed in them should be considered for the purpose of putting the present invention into proper perspective relative to the prior art.

BRIEF SUMMARY

The present invention includes improved tooling, and in particular an improved puller tool, and to an unique split sleeve that is adapted to be used with the tooling.

The tooling may include an inner tubular member that is divided by axial slots into axial fingers having substantially radial end surfaces. It may further include an outer tubular member that surrounds the inner tubular member. The outer tubular member may be divided by axial slots into axial fingers that have radial jaws that are axially spaced from the end surfaces on the fingers of the inner tubular member. The radial jaws have substantially radial surfaces that axially confront the end surfaces on the axial fingers of the first tubular member. The jaws further have cylindrical surface segments that extend axially from the substantially radial surfaces. A split sleeve is provided for use with this tooling. The split sleeve comprises a substantially cylindrical body portion having an axial edge at a first end and a substantially radial flange at an opposite second end. The radial flange projects radially outwardly from the cylindrical body portion. The sleeve includes an axial split that extends through both the substantially radial flange and the cylindrical body portion of the sleeve. The radial flange has a substantially radial first surface that is contactable with the substantially radial end surfaces on the axial fingers of the first tubular member. It also has a substantially radial second surface that is contactable with the substantially radial surfaces on the jaws that are on the outer tubular member. The substantially cylindrical body portion of the sleeve has a substantially cylindrical neck portion that extends axially from the flange into a position contiguous the substantially cylindrical segments on the substantially radial jaws of the outer tubular member. This happens when the substantially radial flange on the sleeve is positioned axially between the end surfaces on the axial fingers of the inner tubular member and the confronting, substantially radial surfaces on the jaws of the outer tubular member. In use, the end surfaces on the axial fingers of the first tubular member and the jaws on the axial fingers of the second tubular member are moved relatively together so that they clamp between them the substantially radial flange that is at the second end of the sleeve.

The present invention includes providing a puller tool for pulling a mandrel through a split sleeve that is in an opening in a workpiece. This puller tool is basically characterized by an elongated first tubular member having a mandrel receiving center passageway and a slotted outer end portion comprising first axial fingers separated by first axial slots. An elongated second tubular member surrounds the first tubular member and includes a slotted outer end portion comprising second axial fingers separated by second axial slots. An elongated third tubular member surrounds the second tubular member and includes a slotted outer end portion comprising third axial fingers separated by third axial slots. The puller tool includes an elongated mandrel that is positioned for moving axially in the center passageway of the first tubular member. The mandrel has a small diameter inner end portion, a large diameter outer end portion, and an increasing diameter portion extending from the small diameter inner end portion to the large diameter outer end portion. The third fingers have outer end portions forming an end opening and radially inwardly projecting clamp jaws having substantially radial first clamp surfaces. The first axial fingers include outer end portions having substantially radial second clamp surfaces which confront the first clamp surfaces. The first tubular member is extendable and retractable longitudinally of the second and third tubular members. The first and second tubular members have first and second cam surfaces. The first cam surfaces are radially outwardly directed on the first axial fingers. The second cam surfaces are radially inwardly directed on the second axial fingers. The first and second cam surfaces are adapted to contact each other and expand the second axial fingers radially in response to the first tubular member being retracted into the second tubular member. The expansion of the second axial fingers is adapted to cause an expansion of the third axial fingers and an enlargement of the end-opening formed by the jaws at the ends of axial fingers of the third tubular member. The tooling further includes a tubular sleeve having an inner end and a flange projecting radially outwardly from the sleeve at the first end. The flange is sized to move axially through the end opening in the outer end of the third tubular member when the third axial fingers are expanded. The flange is also sized to be received between and be clamped by the first and second clamp surfaces when the first tubular member is extended axially and the second and third axial fingers are contracted radially. The tubular sleeve has a tubular portion that projects outwardly from the flange and an end opening when the flange is clamped by and between the first and second clamp surfaces. The mandrel is extendable axially through the center passageway of the first tubular member and axially through the tubular sleeve when the radial flange is clamped by and between the first and second clamp surfaces. The mandrel is retractable through the sleeve and into the center passageway when the radial flange is clamped by and between the first and second clamp surfaces.

Preferably, the puller tool also comprises a housing having a first end including an end opening. The first tubular member has an inner end portion which extends through the end opening into the housing. The second and third tubular members have inner ends that are connected to the first end of the housing.

Preferably also, the puller tool includes a push-pull member within the housing to which the inner end of the first tubular member is connected. This push-pull member is preferably tubular and the elongated mandrel has an inner end portion that extends from the first tubular member into the push-pull member. There is a second push-pull member in said housing to which the mandrel is connected.

In preferred form, the mandrel includes an endwise outwardly tapering portion extending endwise outwardly beyond the large diameter outer end portion of the mandrel. The clamp jaws of the third fingers include axial surfaces extending axially from the substantially radial first clamp surfaces. The outer end portions of the first axial fingers include axial surfaces that extend axially from the radial second clamp surfaces. When the flange on the sleeve is clamped by and between the first and second clamp surfaces, the axial surfaces on the first axial fingers are contiguous the axial surfaces on the clamp jaws.

In preferred form, the tubular sleeve has a single axial split and is adapted to expand in diameter in response to the large diameter portion of the mandrel being moved axially through it.

The puller tool is connected to a suitable support that is controllable to move the puller tool towards a sleeve, for receiving the sleeve, and then moving the sleeve and puller tool to an opening in a workpiece. The tool is moveable to insert the sleeve into the opening in the workpiece. The mandrel is retractable to move it through the sleeve that is in the opening in the workpiece. After the mandrel has passed through the sleeve, the tool and sleeve are moveable together away from the workpiece. The puller tool is adapted to then release the sleeve. The mechanism for removing the puller tool may be a robotic mechanism. It may be adapted to suitably position the puller tool relative to an opening that extends vertically, horizontally or diagonally.

These and other advantages, objects, and features will become apparent from the following best mode description, the accompanying drawings, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 7 is a pictorial view of the sleeve shown by FIGS. 4–6, with the flange end of the sleeve at the bottom and the opposite end at the top;

FIG. 8 is an exploded pictorial view of the nose piece for the puller tool, showing the internal components of the tool which are housed within the nose piece;

BEST MODE FOR CARRYING OUT THE INVENTION

Figure 1:
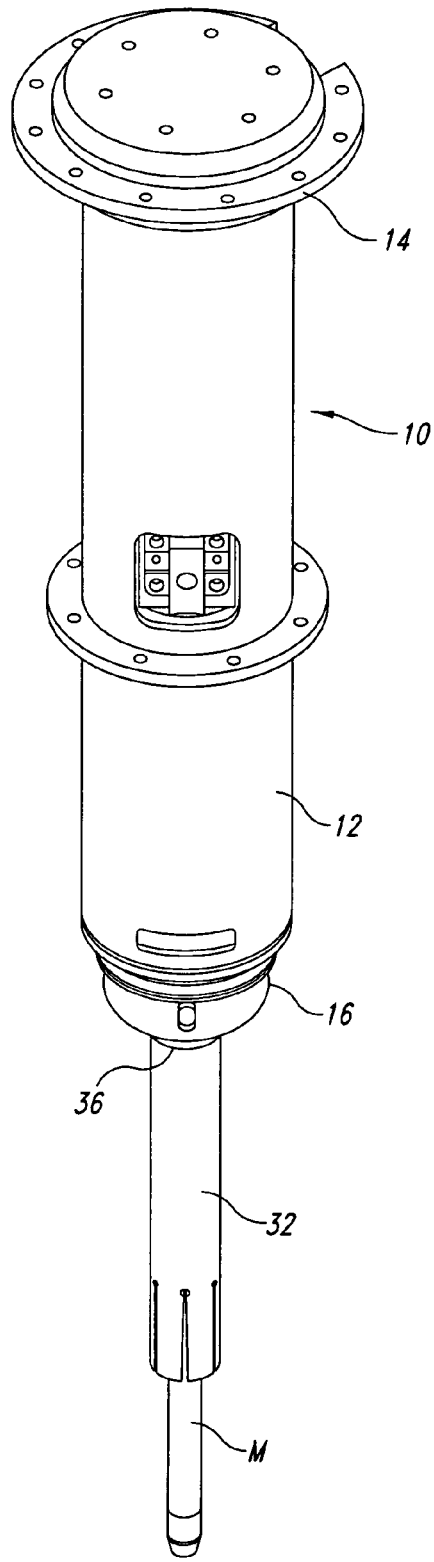
FIG. 1 is a pictorial view of a puller tool which includes a mandrel that is extendable and retractable, such view showing the mandrel extended.
Figure 2:
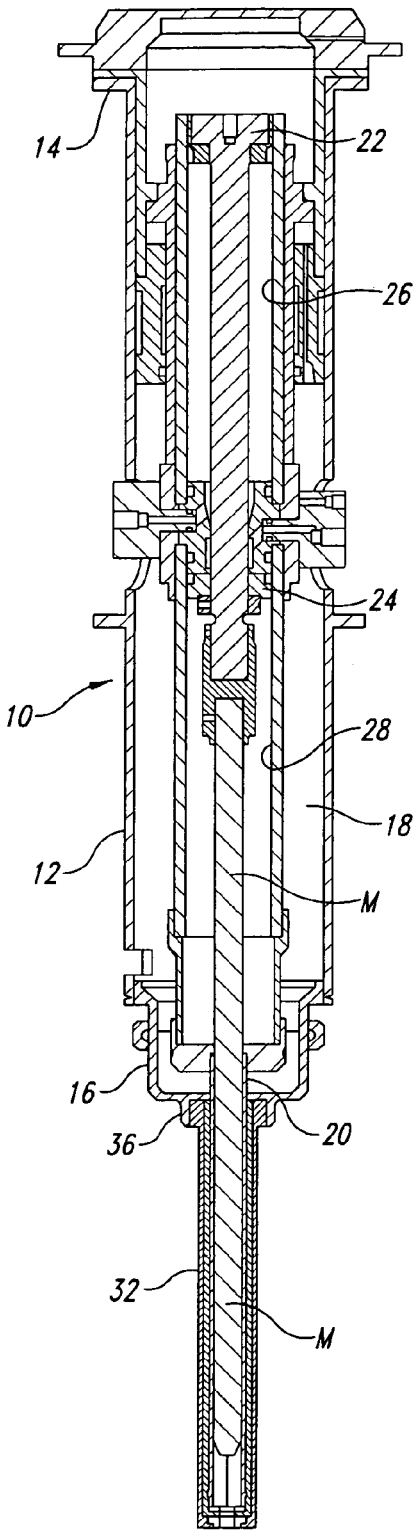
FIG. 2 is a longitudinal sectional view of the puller tool shown by FIG. 1, but showing the mandrel retracted.
Figure 3:
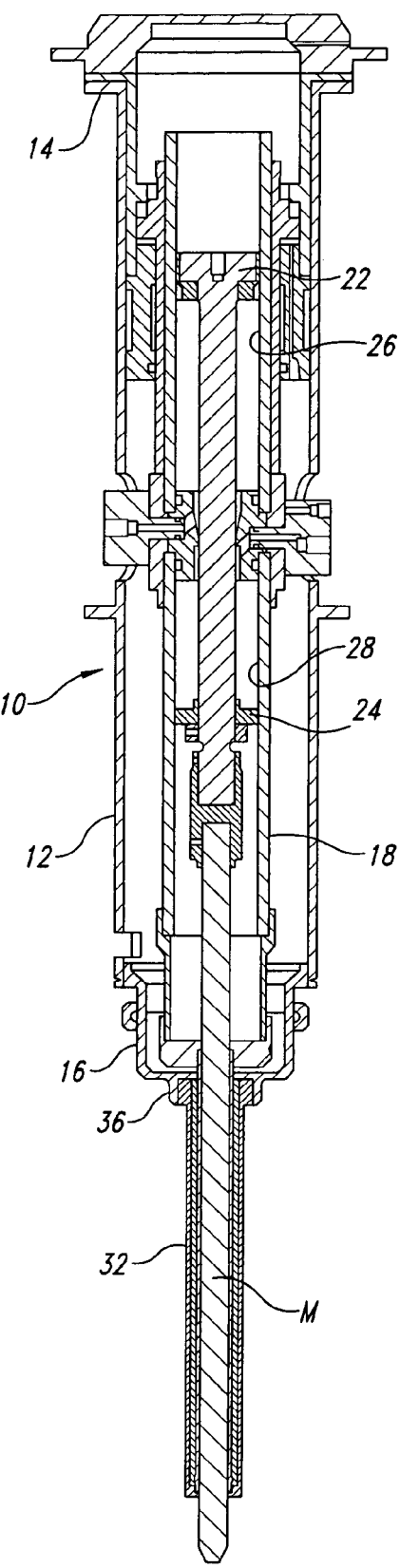
FIG. 3 is a view like FIG. 2, but showing the mandrel partially extended.
Figure 4:
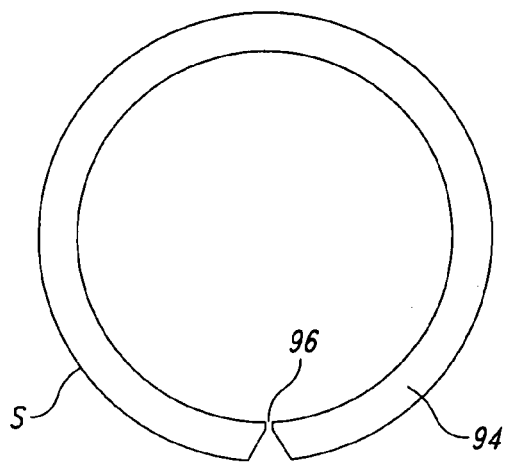
FIG. 4 is a plan view of a split sleeve, looking towards a flange at one end of the sleeve.
Figure 5:
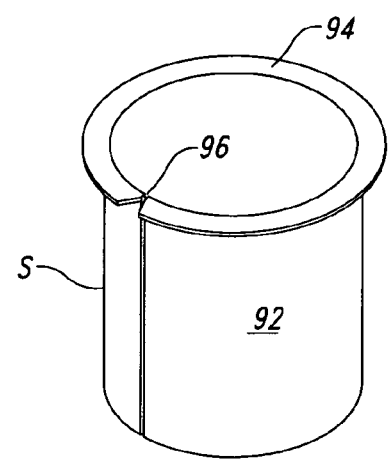
FIG. 5 is a pictorial view of the sleeve shown by FIG. 4, such view being taken from above and looking towards the flange and a side portion of the sleeve that includes a longitudinal slot.
Figure 6:
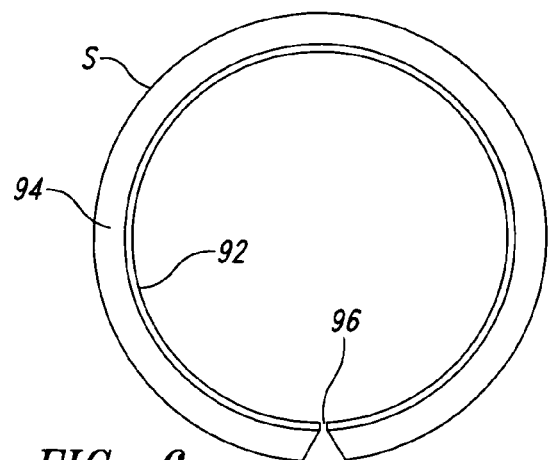
FIG. 6 is a plan view of the sleeve looking towards the second end of the sleeve, opposite the flanged end.

Referring to FIGS. 1–3, a puller tool 10 is shown in a vertical position. However, it is to be understood that, the in-use orientation of the puller tool 10 is dictated by the orientation of the workpiece. For example, if the workpiece extends horizontally, the puller tool 10 will be positioned vertically, with its mandrel end directed either downwardly or upwardly. If the workpiece is disposed vertically, the puller tool will be disposed horizontally. If the workpiece extends somewhere between horizontal and vertical, the puller tool 10 will extend diagonally with its longitudinal axis extending substantially perpendicular to the workpiece. The puller tool 10 may be suitably supported and guided by a robotic mechanism that is operable to provide the necessary and desired movement and orientation of the puller tool 10. See, for example, FIG. 1 of the aforementioned U.S. Pat. No. 5,305,627.

The puller tool 10 preferably includes an outer housing 12 having a first end 14 and a second end 16. An elongated inner housing 18 is positioned within outer housing 12. The lower end of inner housing 18 is connected to a first tubular member 20. The inner housing 18 and the first tubular member 20 are moveable axially together relative to the outer housing 12. A piston is positioned within the inner housing 18. It includes a first piston head 22 and a second piston head 24. Piston head 22 is moveable axially in a cylinder section 26. Piston head 24 is moved axially in a cylinder section 28. The lower end (as illustrated) of the piston is connected to an elongated mandrel M.

In FIG. 8, the mandrel M is shown related to the elongated first tubular member 20, an elongated second tubular member 30 and an elongated third tubular member 32. Tubular member 20 surrounds the mandrel M. Tubular member 30 surrounds the tubular member 20. Tubular member 32 surrounds the tubular member 30. Tubular members 30, 32 have end portions 34, 36 that are connected to the end 16 of the housing 12. As a result, tubular members 30, 32 are fixed in position axially relative to the housing 12. As already described, the tubular member 20 is connected to the inner housing 18 which is moveable back and forth axially. Accordingly, first tubular member 20 is moveable axially relative to both the second tubular member 30 and the third tubular member 32. The mandrel M is moveable axially relative to all three tubular members 20, 30, 32.

Figure 10:
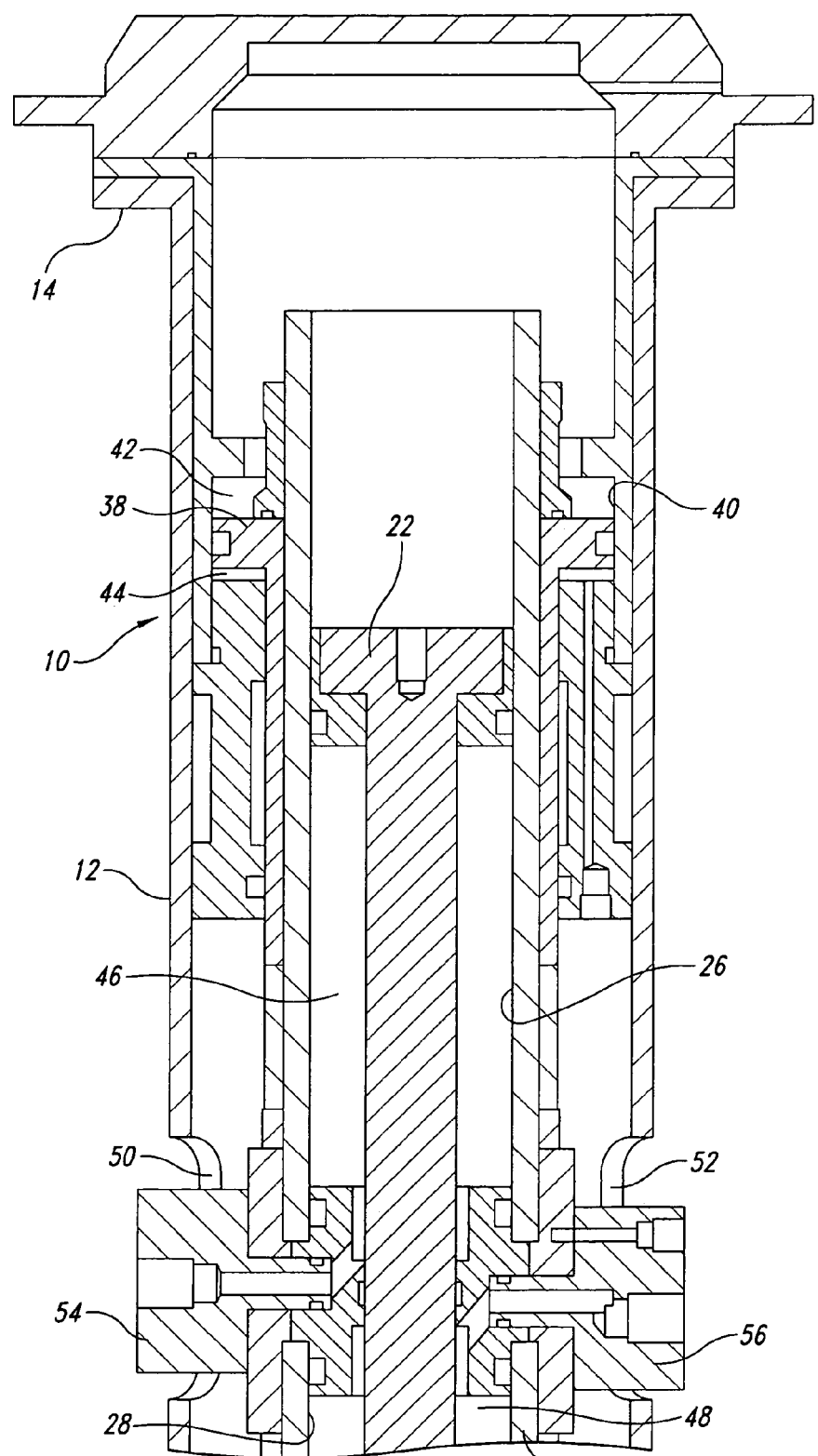
FIG. 10 is a view of the upper portion of FIG. 9 on yet a larger scale.
Figure 11:
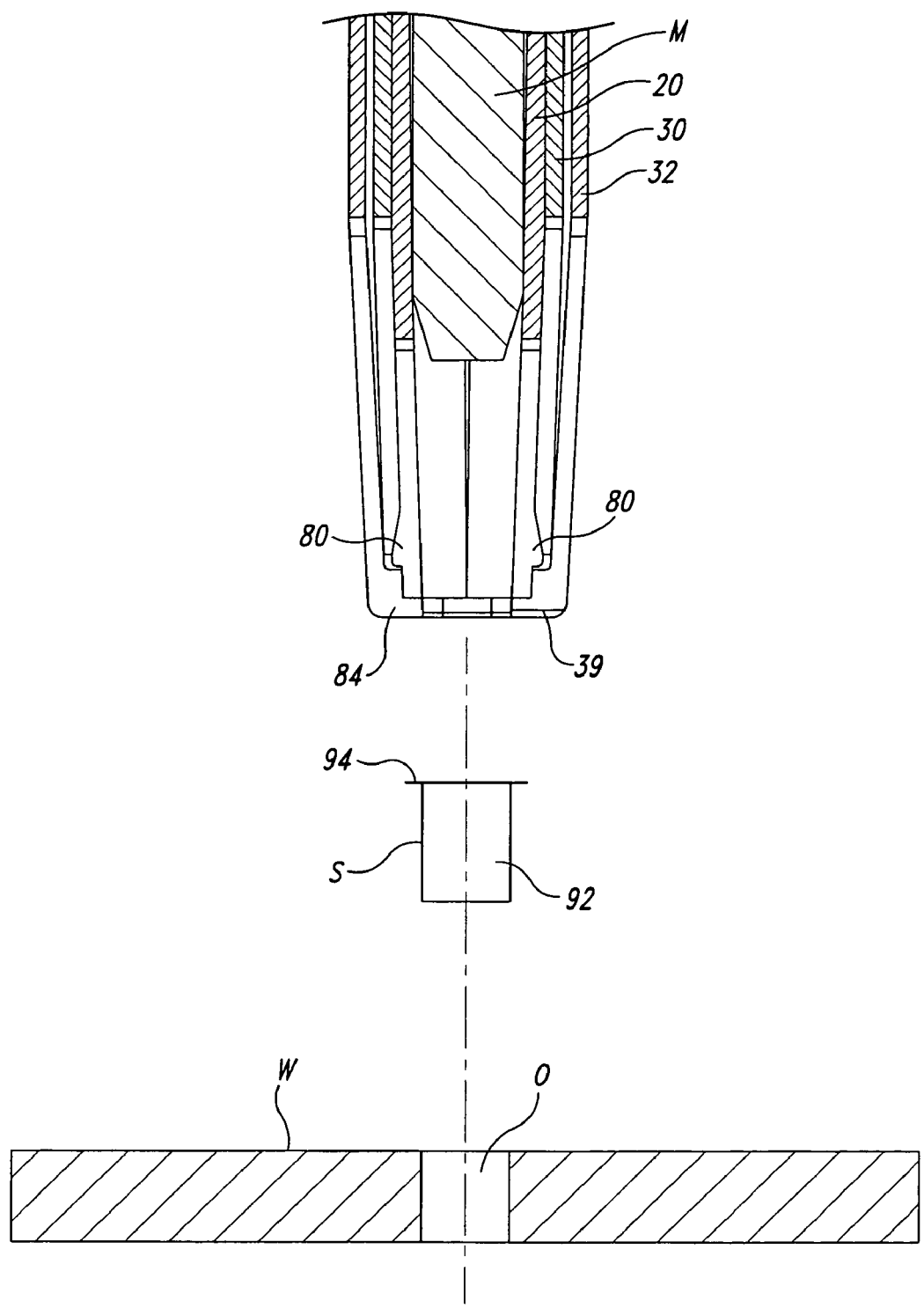
FIG. 11 is an axial sectional view of a work piece, a split sleeve and the lower nose piece portion of the puller tool, such view showing the split sleeve spaced below the nose portion of the puller tool and above an opening for the split sleeve in the work piece.

As best shown by FIG. 10, the inner housing 18 carries a piston head 38 that is positioned within a tubular cavity 40. A first working chamber 42 is provided above the piston head 38 and a second working chamber 44 is provided below the piston head 38. The introduction of a pressure fluid into chamber 44 while chamber 42 is vented will cause piston head 38 and the inner housing 18 to which it is connected to move upwardly relative to the outer housing 12. The venting of chamber 42 while pressure fluid is introduced into chamber 44 will cause an upward movement of the piston head 38 and the inner housing 18 relative to the outer housing 12. It is in this manner that the inner housing 18 and the first tubular member 20 are moved axially within the tool 10.

A working chamber 46 is provided below piston head 22 and a working chamber 48 is provided above piston head 24. The simultaneous introduction of a pressure fluid into chamber 48 and a release of pressure fluid from chamber 46 will cause the piston, including the piston heads 22, 24, and the mandrel M to move downwardly. The introduction of a pressure fluid into chamber 46 while chamber 48 is vented will cause the piston 22, 24 and the mandrel M to move upwardly.

Figure 9:
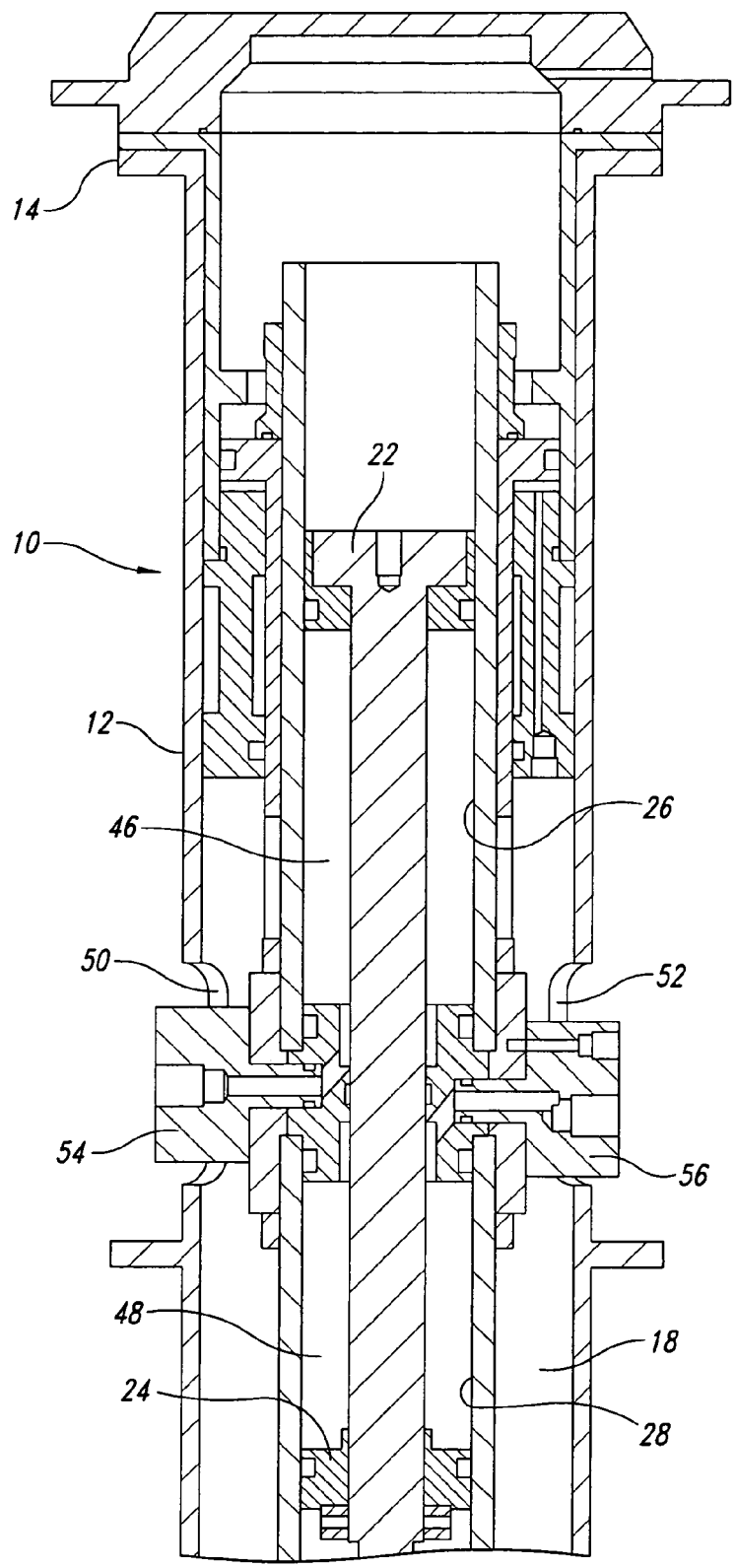
FIG. 9 is an enlarged-scale, fragmentary view of the upper portion of FIG. 2, but showing a piston within the tool moved downwardly from the position that it occupies in FIG. 2.

In the illustrated embodiment, a pair of diametrically opposite openings 50, 52 are provided in the outer housing 12. Fluid transmitting fittings 54, 56, connected to the inner housing 18, are positioned within these openings 50, 52. As can be clearly seen from FIG. 9, when the inner housing 18 moves up or down, the fittings 54, 56 are free to move in the openings 50, 52.

The particular mechanism for moving the mandrel axially and the first tubular member axially can vary substantially. All that is necessary is that the mandrel M be connected to a driver that is moveable back and forth along the axis of the mandrel M and the inner housing 18 is connected to a driver that is capable of moving the inner housing 18 back and forth along the same axis on which the mandrel M moves.

Referring again to FIG. 8, the first tubular member 20 has a mandrel receiving center passageway 60 and a slotted outer end portion 62 comprising first axial fingers 64 separated by first axial slots 66. The second tubular member 30 has a slotted outer end portion 68 that includes second axial fingers 70 separated by second axial slots 72. The third tubular member 32 has a slotted outer end portion 74 comprising third axial fingers 76 separated by third axial slots 78. The fingers 64, 70, 76 are all in the nature of leaf springs. Their free ends bend radially inwardly and outwardly as bending forces are applied to and removed from them.

Figure 14:
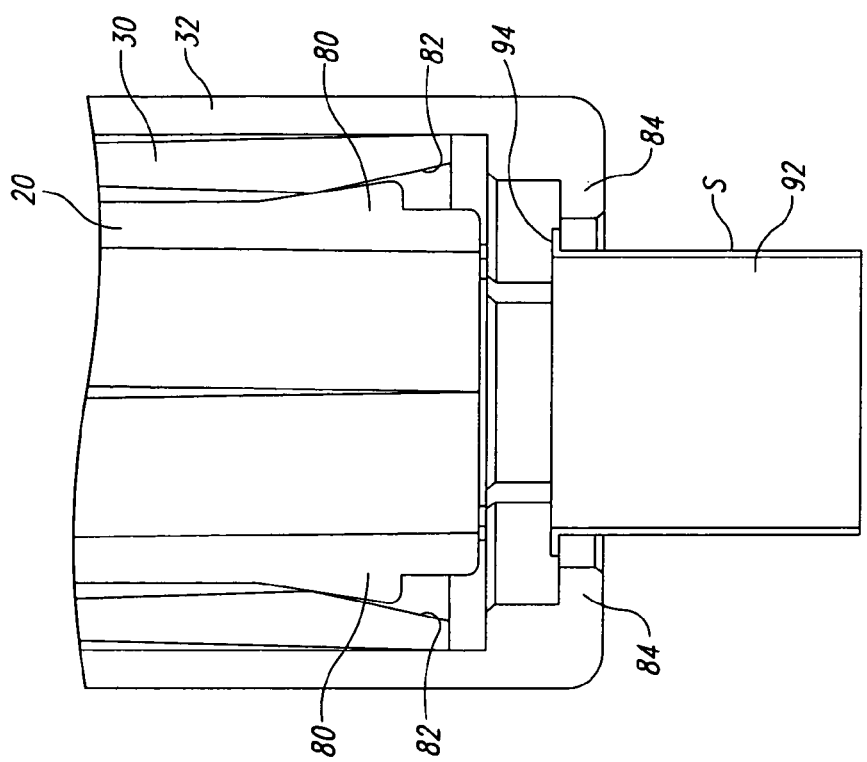
FIG. 14 is a view like FIG. 13 but showing the cam tube within the nose piece extended so as to release the spreading force on the nose piece so that the nose piece will retract radially and engage the split sleeve.
Figure 15:
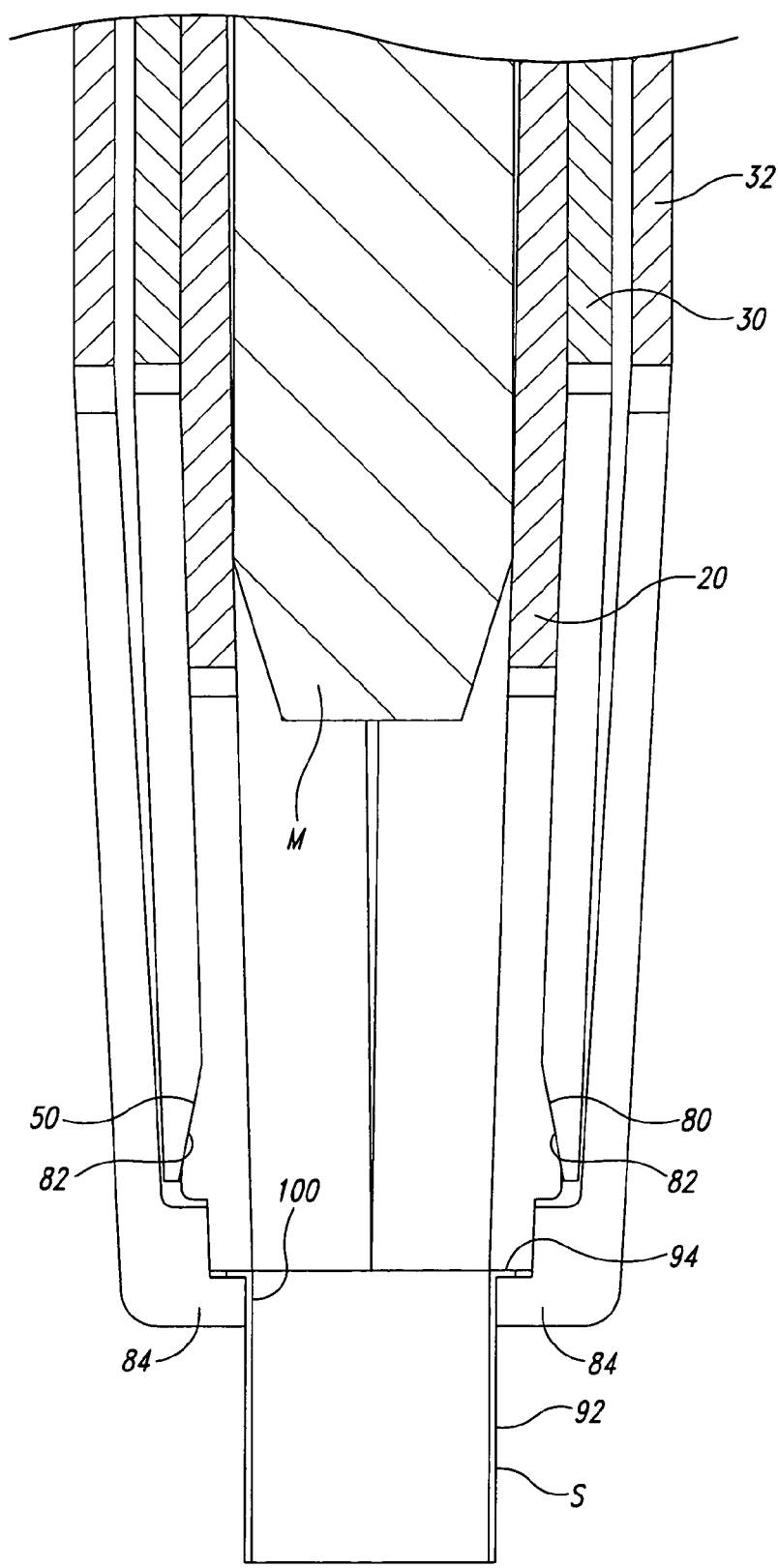
FIG. 15 is a view like FIGS. 13 and 14, but showing a greater amount of the nose piece assembly, such view showing the flange of the split sleeve clamped between the nose piece and the cam tube and showing the mandrel retracted.
Figure 17:
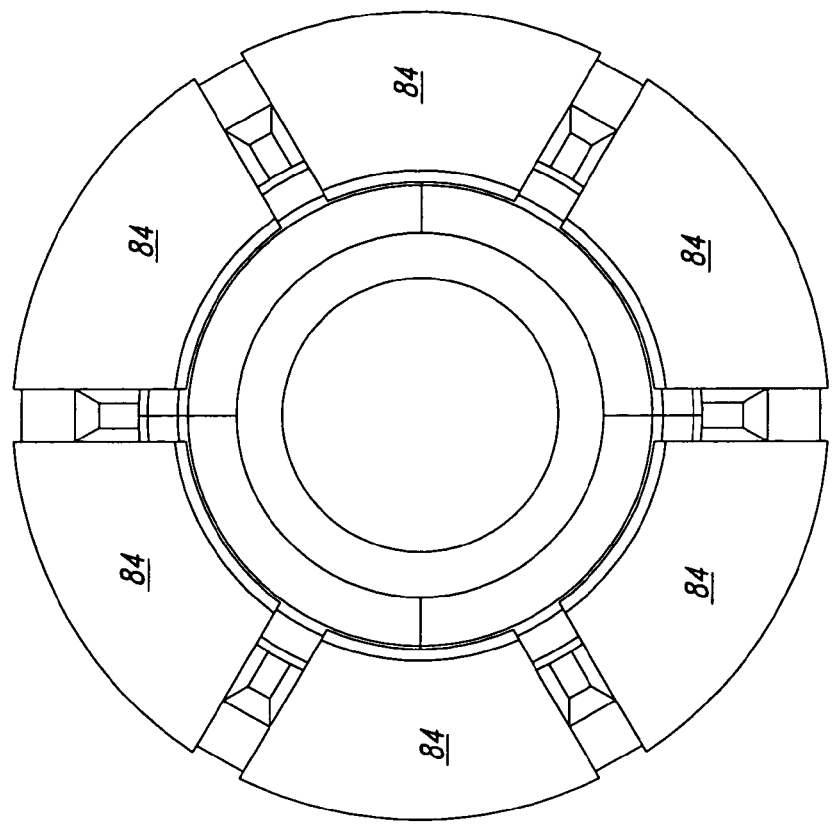
FIG. 17 is a view like FIG. 16, but showing an end view when the cam tube is retracted, causing the jaws of the nose piece to spread.

Referring now to FIGS. 8 and 12–15, the first axial fingers 64 have first cam surfaces 80 that are radially outwardly directed. The second axial fingers include second cam surfaces 82 that are radially inwardly directed. In response to a retraction of the first tubular member 20 into the second tubular member 30, the cam surfaces 80, 82 cooperated to exert a radially outwardly directed spreading force on the second fingers 70. This outward springing movement of the fingers 70 causes them to contact and spring outwardly the third fingers 76. In response to an extension of the first tubular member 20 within the second tubular member 30, the cam surface 80, 82 cooperate to remove the radially outwardly directed force on the fingers 70, allowing the stored spring energy in them to return them to their at-rest positions in which they are relaxed axial extensions of the rest of the tubular member 30. This release of the bending forces on fingers 70 likewise causes a release of the bending forces on fingers 76, allowing them to resume their at-rest position in which they are relaxed and extend axially from the rest of the tubular member 32. This is shown in FIG. 15.

The fingers 70 have radially inwardly directed jaws 84 at their free ends. These jaws 84 include radial clamp surfaces 86 and axial surfaces 88 which are segments of a cylinder. The first tubular member 20 includes substantially radial end surfaces 90 at their free ends. The substantially radial surfaces 86 constitute substantially radial first clamp surfaces. The end surfaces 90 constitute substantially radial second clamp surfaces. The clamp surfaces 86, 90 are arranged to confront each other in the axial direction when the tubular members 20, 30, 32 are in the position shown by FIG. 15.

Reference is now made to FIGS. 4–7 and 11–15. These figures show a sleeve S that consists of a tubular body 92 and a radial flange 94. The body 92 is substantially cylindrical and the flange 94 extends in a plane that is substantially perpendicular to the axis of the body 92. The body 92 and the flange 94 are both split, as clearly shown by FIGS. 4–7. The split 96 extends axially of the body portion 92 and radially of the flange 94. In its extent in the flange 94, the split 96 may widen as it extends radially outwardly. The sleeve S is internally lubricated to facilitate movement on the mandrel M through it.

Referring to FIG. 8, the mandrel M includes a small diameter inner portion 98, a large diameter outer end portion 100 and a transition portion 102 extending between the portions 98, 101. The mandrel M preferably includes a tapered tip 104, as illustrated.

Figure 12:
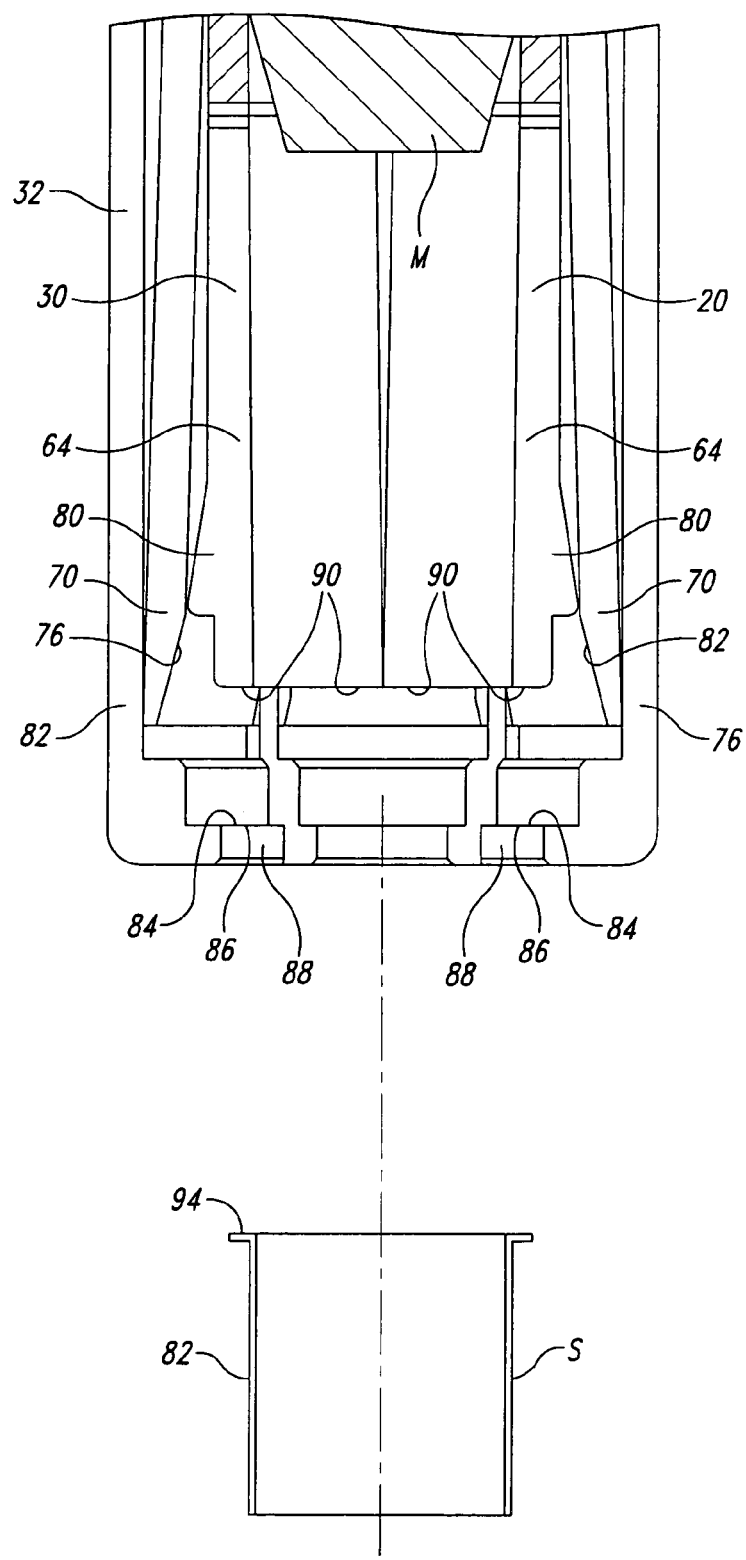
FIG. 12 is an enlarged scale view of the nose piece and split sleeve portions of FIG. 11.
Figure 13:
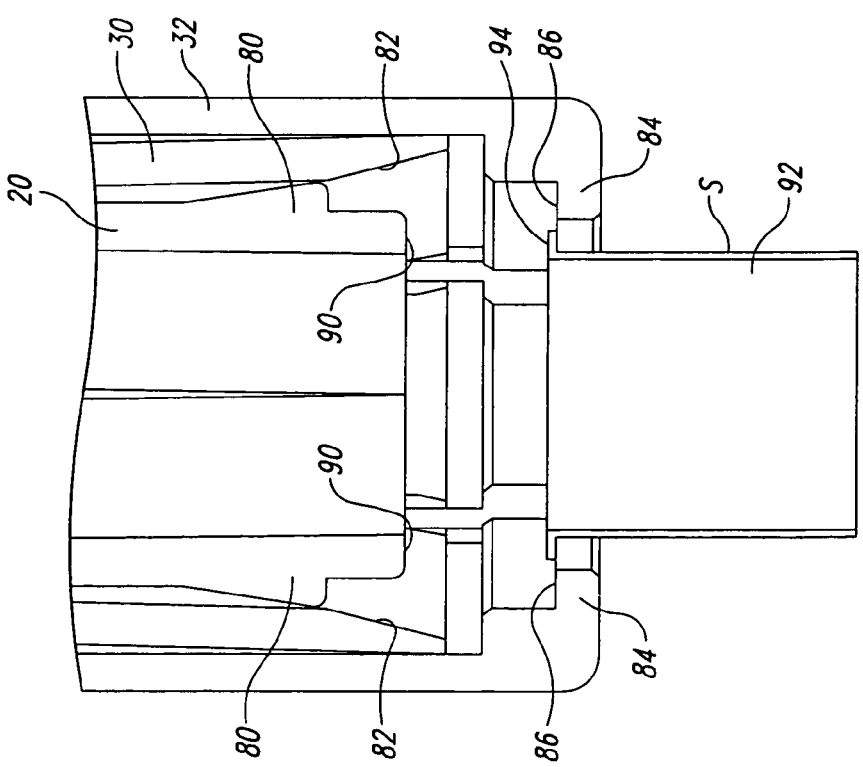
FIG. 13 is a view generally like FIG. 12 but showing the split sleeve moved upwardly to place its flange within a lower end opening in the nose piece.
Figure 16:
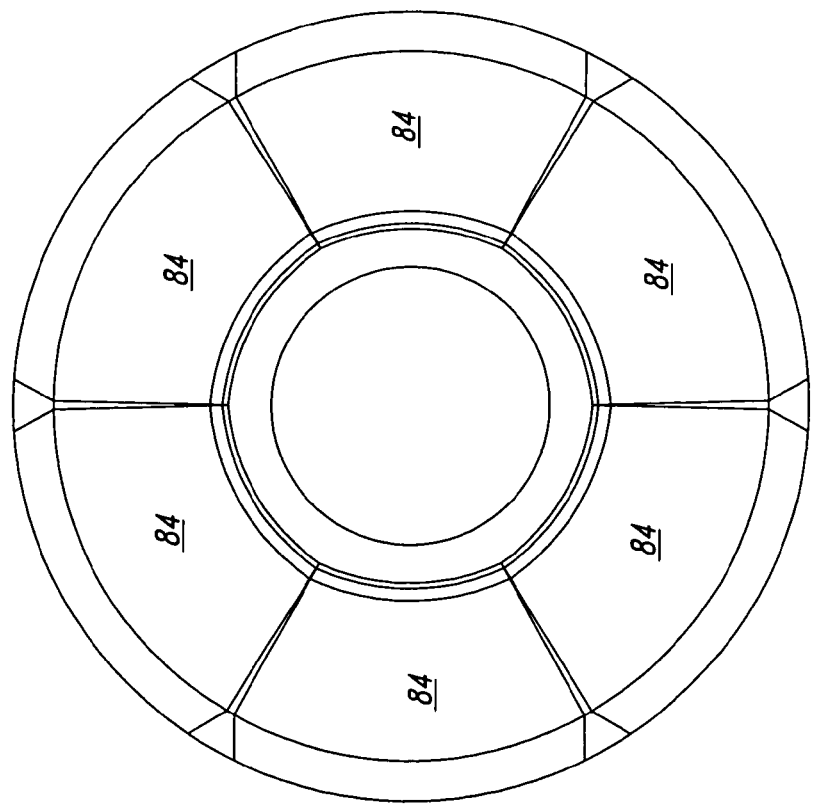
FIG. 16 is an end view of the nose piece assembly when the cam tube is extended.

FIG. 12 shows the first tubular member retracted and the jaws 84 spread apart. This enlarges the opening that is formed by the surfaces 88 to make it large enough to receive the flange 94. FIG. 13 shows the flange 94 of the sleeve S being moved axially into a cavity within the end portion of the third tubular member 32. The sleeve S may be fed by hand into this cavity. Or it may be supported in some suitable manner and either the support is moved toward the tool 10, or the tool 10 is moved towards the support, in order to cause the flange 94 to enter into the cavity. Once the flange 94 is within the cavity, the first tubular member 20 is extended, so as to cause the jaws 84 to move together. FIG. 14 shows the jaws 84 moved partway together and FIG. 15 shows the jaws 84 moved all of the way together. When the members are in the position shown by FIG. 16, a tubular neck portion 100 of the sleeve S is positioned contiguous the cylindrical segments 88 (FIG. 12). The inner surface of the flange 94 is in contact with the clamp surfaces 86. The outer or opposite surface of the flange 94 is in contact with the clamp surfaces 90. Full extension of the first tubular member 20 pushes the clamp surfaces 90 against the flange 94 and clamps the flange 94 between the clamp surfaces 86, 90. When the sleeve S is clamped in this manner to the end of the tool 10, the tool can be picked up and moved to a workpiece W and then put into axial alignment with an opening O in the workpiece W. Then, the puller tool 10 is moved towards the workpiece W for the purpose of placing the sleeve S within the opening O. This is all done with the mandrel M extended.

Figures 18, 19:
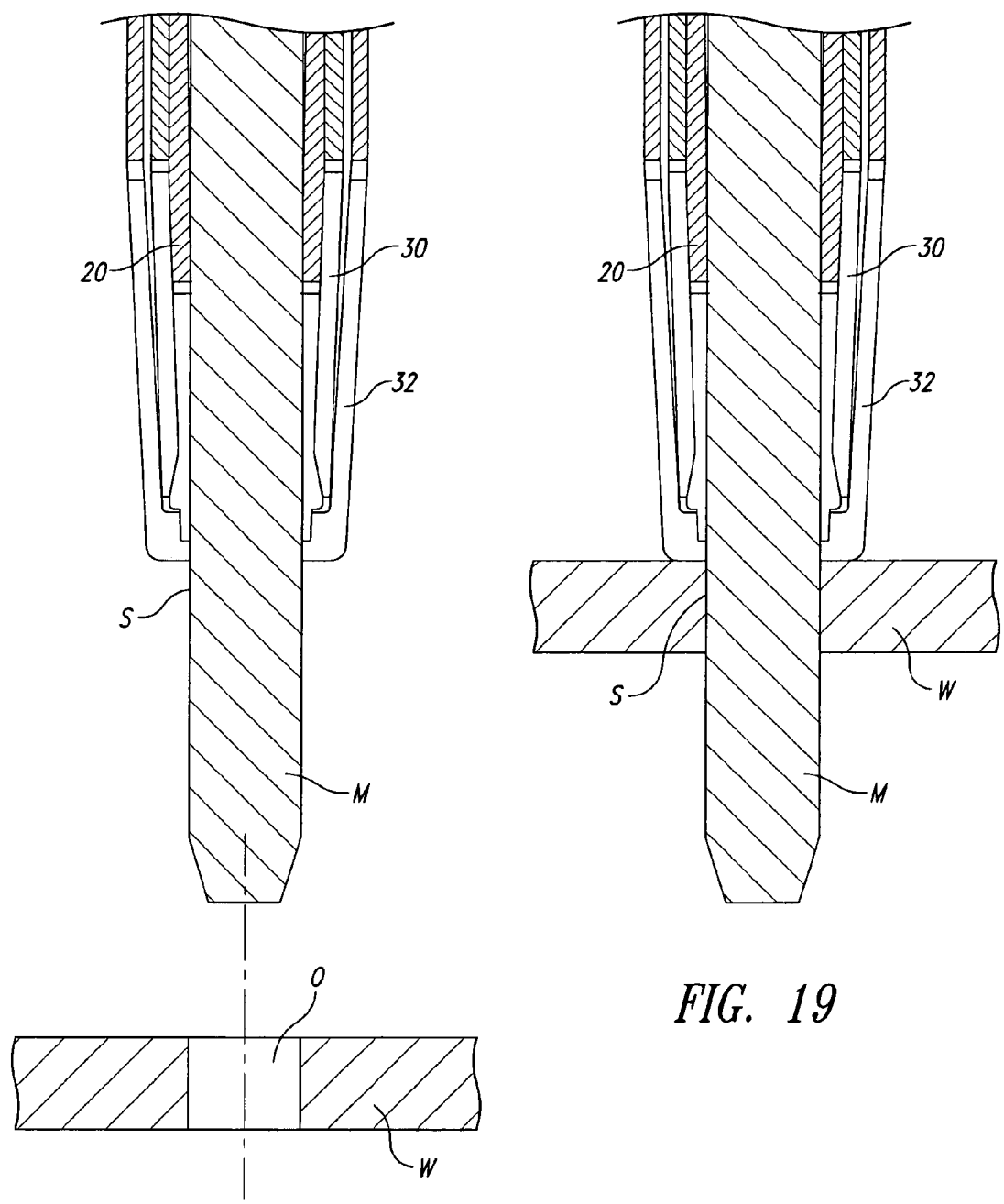
FIG. 18 is a view like FIG. 15, but showing the mandrel extended and in alignment with an opening in the work piece.
FIG. 19 is a view like FIG. 18, but showing the nose piece and mandrel moved towards the work piece and the mandrel and split sleeve moved into the opening in the work piece.
Figure 21:
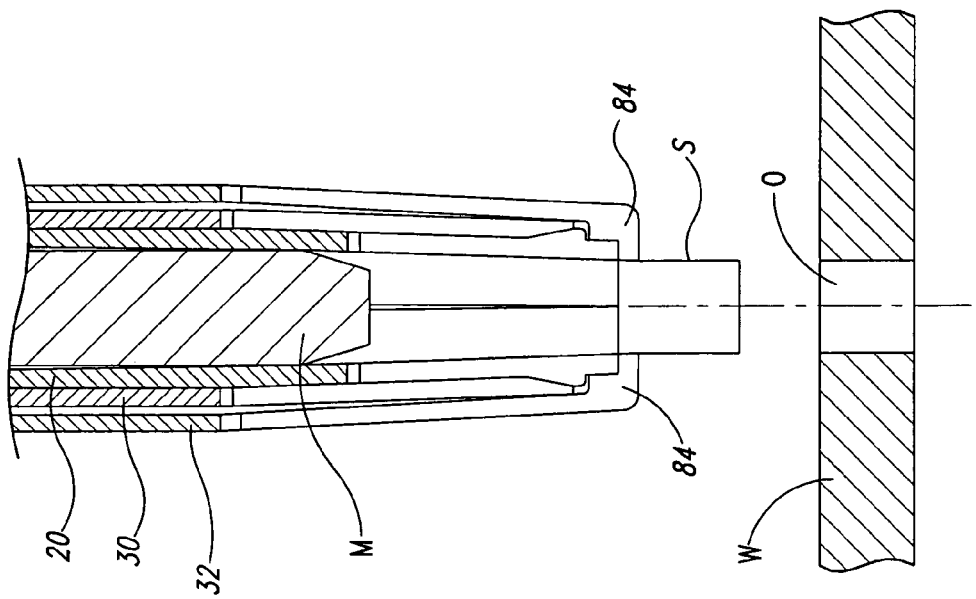
FIG. 21 is a view like FIG. 20, but showing the nose piece assembly and the split sleeve moved away from the work piece.
Figure 20:
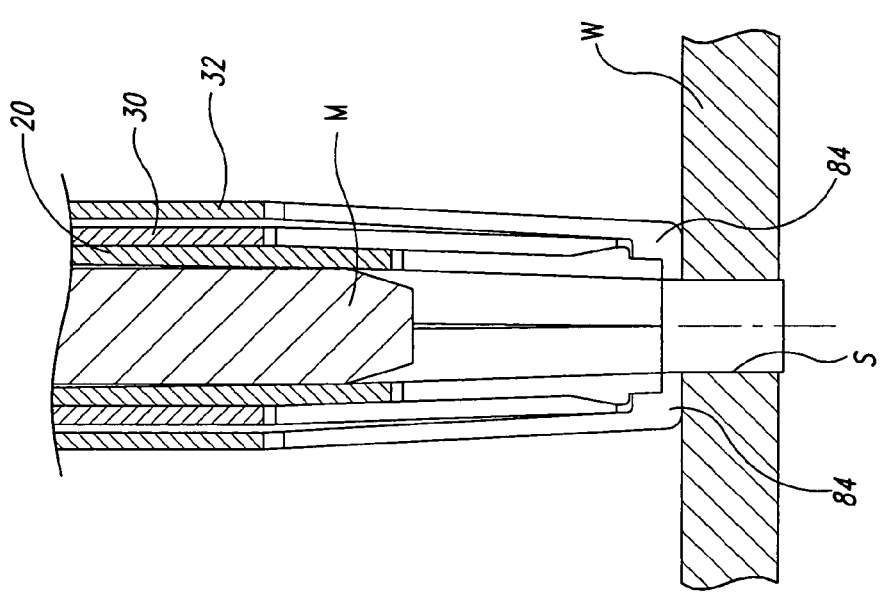
FIG. 20 is a view like FIG. 19, but showing the mandrel retracted, the nose piece still against the work piece and the split sleeve still within the opening in the work piece.
Figure 24:
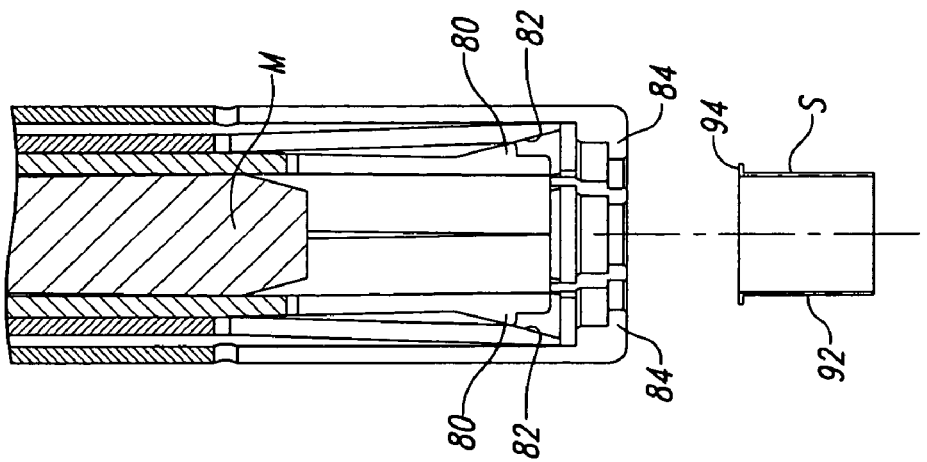
FIG. 24 is a view like FIG. 23, but showing the split sleeve in the process of moving out from the nose piece.
Figure 23:
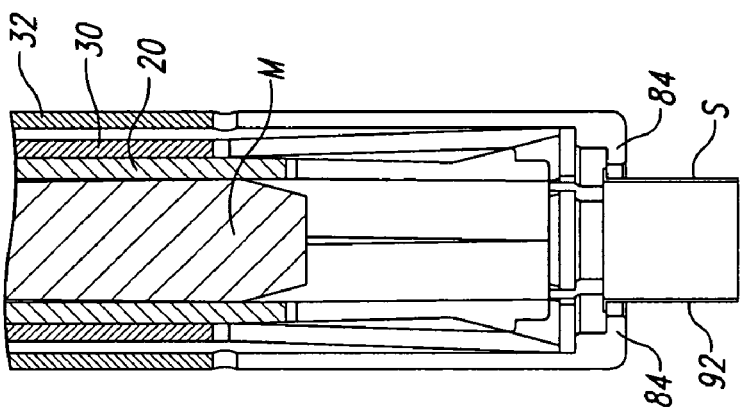
FIG. 23 is a view like FIG. 22, but showing the cam tube retracted to the extent that the opening formed by the jaws at the lower end of the nose piece is larger in diameter than the diameter of the flange on the split sleeve.
Figure 22:
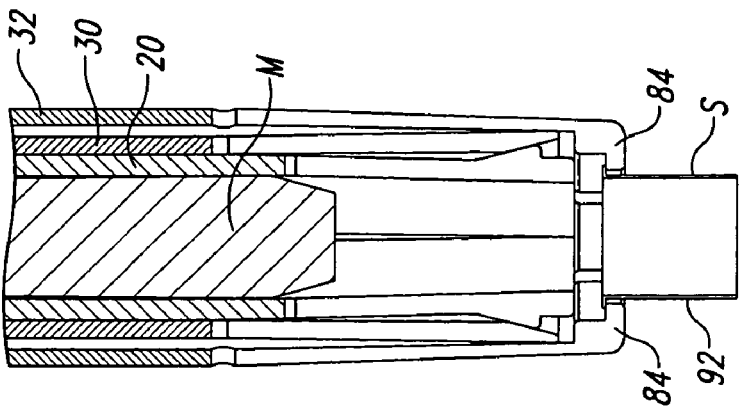
FIG. 22 is a view like FIG. 21, but showing the cam tube being retracted for the purpose of spreading the jaws of the nose piece away from the flange end of the split sleeve.

When the mandrel M is extended through the sleeve S, its tapered end portion 104 will guide the mandrel M into the sleeve S. Its large diameter portion 101 will expand the sleeve S, allowing the sleeve to move past the large diameter portion 101 and the transitional portion 102 and onto the small diameter portion 98. When the sleeve S is on the small diameter portion 98, it will be contracted and its tubular portion 92 will fit easily into the opening O in the workpiece W. Thus, with the mandrel M extended, and a sleeve S on the small diameter portion 98 of the mandrel M, the mandrel is first moved into and through the opening O, followed by the sleeve S. FIG. 18 shows the extended mandrel M, the sleeve S and the tool 10 being moved towards the opening O in the workpiece W. FIG. 19 shows the mandrel M moved through the opening O and the sleeve S within the opening O. When the tooling is in this position, the mandrel is ready to be retracted through the sleeve S, for cold expanding the opening O. FIG. 20 shows the mandrel M retracted into the puller tool 10 and shows the sleeve S still in the opening O. The flange 94 is still clamped between the clamping surfaces 86, 90. As a result, the sleeve S is connected to the jaw end of the third tubular member 32. This allows a retraction of the puller tool 10 away from the workpiece W. This retraction removes the sleeve S from the cold expanded opening O. Now, the sleeve can be moved to a discharge station. At the discharge station, the first tubular member 20 is again retracted, as shown by FIGS. 22–24. When it is fully retracted, the sleeve S is released from the jaws 84. (FIG. 23) This allows the sleeve S to drop free of the tool 10 (FIG. 24). Then, the puller tool 10 can be reset for reception of another sleeve S and moved into position for insertion into another opening O.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein, but rather determined by the following claims, interpreted according to accepted doctrines of claim interpretation, including use of the doctrine of equivalents and reversal of parts.

What is claimed is:

1. A puller tool for cold working an opening in a workpiece, the puller tool comprising:

an elongated mandrel having a first circumference portion sized to radially expand the opening in the workpiece;

an elongated first tubular member having a mandrel receiving center passageway and a slotted outer end portion comprising first axial fingers separated by first axial slots;

an elongated second tubular member surrounding the first tubular member and having a slotted outer end portion comprising second axial fingers separated by second axial slots;

an elongated third tubular member surrounding the second tubular member and having a slotted outer end portion comprising third axial fingers separated by third axial slots;

the third fingers having outer end portions forming an end opening and including radially inwardly projecting clamp jaws having substantially radial first clamp surfaces;

the first axial fingers including outer end portions having substantially radial second clamp surfaces which confront the first clamp surfaces;

the first tubular member being extendable and retractable longitudinally with respect to the second and third tubular members;

the first and second tubular members having first and second cam surfaces, the first cam surfaces being radially outwardly directed on the first axial fingers and the second cam surfaces being radially inwardly directed on the second axial fingers;

the first and second cam surfaces being adapted to contact each other and expand the second axial fingers radially in response to the first tubular member being retracted into the second tubular member, and the expansion of the second axial fingers being adapted to cause an expansion of the third axial fingers and an enlargement of the end opening formed by the axial fingers of the third tubular member;

a tubular sleeve having an inner end and a flange projecting radially outwardly from the sleeve at the inner end, the flange being sized to move axially through the end opening in the outer end of the third tubular member when the third axial fingers are expanded, and the flange being sized to be received between and be clamped by the first and second clamp surfaces when the first tubular member is extended axially and the second and third axial fingers are contracted radially;

the tubular sleeve having a tubular portion that extends axially from the flange and the end opening when the flange is clamped by and between the first and second clamp surfaces;

the mandrel being extendable axially through the center passageway of the first tubular member and axially through the tubular sleeve when the radial flange is clamped by and between the first and second clamp surfaces; and the mandrel being retractable through the sleeve and into the center passageway, when the radial flange is clamped by and between the first and second clamp surfaces.

2. The puller tool of claim 1, comprising a housing having a first end including an end opening, wherein the first tubular member has an inner end portion which extends through the end opening into the housing, and the second and third tubular members have inner ends which are connected to the first end of the housing.

3. The puller tool of claim 2, comprising a push/pull member within the housing to which the inner end of the first tubular member is connected.

4. The puller tool of claim 3, wherein the push/pull member is tubular and the elongated mandrel has an inner end portion that extends from the first tubular member into the push/pull member, and there is a second push/pull member in the housing to which the mandrel is connected.

5. The puller tool of claim 1, wherein the mandrel includes an endwise outwardly tapering portion extending endwise outwardly beyond the large diameter outer end portion.

6. The puller tool of claim 1, wherein the clamp jaws of the third fingers include axial surfaces extending axially from the substantially radial first clamp surfaces, and the outer end portions of the first axial fingers include axial surfaces that extend axially from the radial second clamp surfaces, wherein when the flange on the sleeve is clamped by and between the first and second clamp surfaces, the axial surfaces on the first axial fingers are contiguous the axial surfaces on the clamp jaws.

7. The puller tool of claim 1, wherein the tubular sleeve has a single axial spit and is adapted to expand in diameter in response to the large diameter portion of the mandrel being moved axially through it.

8. The puller tool of claim 7, comprising a housing having a first end including an end opening, wherein the first tubular member has an inner end portion which extends through the end opening into the housing, and the second and third tubular members have inner ends which are connected to the first end of the housing.

9. The puller tool of claim 8, comprising a push/pull member within the housing to which the inner end of the first tubular member is connected.

10. The puller tool of claim 9, wherein the push/pull member is tubular and the elongated mandrel has an inner end portion that extends from the first tubular member into the push/pull member, and there is a second push/pull member in the housing to which the mandrel is connected.

11. The puller tool of claim 7, wherein the mandrel includes an endwise outwardly tapering portion extending endwise outwardly beyond the large diameter outer end portion.

12. The puller tool of claim 7, wherein the clamp jaws of the third fingers include axial surfaces extending axially from the substantially radial first clamp surfaces, and the outer end portions of the first axial fingers include axial surfaces that extend axially from the radial second clamp surfaces, wherein when the flange on the sleeve is clamped by and between the first and second clamp surfaces, the axial surfaces on the first axial fingers are contiguous the axial surfaces on the clamp jaws.

13. A puller tool for cold working an opening in a split sleeve, the split sleeve having an elongated body, a radially extending flange attached to one end of the body, and a longitudinal gap down a length of the body for permitting the split sleeve to be biasly expanded and contracted; the puller tool comprising:

a an elongated mandrel having a first circumference portion sized to radially expand the split sleeve;

a tool housing for receiving the mandrel and for axially guiding the mandrel; and a plurality of shafts assembled to have a cooperative interrelationship, the shafts comprising:

a first shaft having a first set of fingers biasly cantilevered from a portion of the first shaft, the first set of fingers separated by a plurality of axial slots extending from the portion of the first shaft to a terminal end of the first shaft, each of the first set of fingers having a radially extending, tapered protuberance near the terminal end, the first shaft coupled to the tool housing and axially moveable with respect to the housing, the first shaft sized to receive the mandrel in a passageway formed within the first shaft;

a second shaft having a second set of fingers biasly cantilevered from a first portion of the second shaft, the second set of fingers separated by a plurality of axial slots extending from the first portion of the second shaft to a terminal end of the second shaft, a second portion near the end of each finger being complementarily shaped to receive the protuberances on each of the first set of fingers of the first shaft without causing a radial expansion of the second set of fingers, a third portion of each of the finger shaped to engage the protuberances on each of the first set of fingers and cause the radial expansion of the second set of fingers, the second shaft affixed to the tool housing, the second shaft having a passageway sized to receive the first shaft; and a third shaft having a third set of fingers biasly cantilevered from a portion of the third shaft, the third set of fingers separated by a plurality of axial slots extending from the portion of the third shaft to a terminal end of the third shaft, each finger of the third shaft having a radially inwardly projecting flange, the third set of finger being in an expanded position when the protuberances on each the first set of fingers are recessed within the second portion of each of the second set of fingers, the third set of finger being in a relaxed position when the protuberances on each the first set of fingers are moved into contact with the third portion of each of the second set of fingers, the expanded position permitting the third set of fingers to receive the radially extending flange of the split sleeve, the contracted position permitting the radially inwardly projecting flanges on each of the third set of fingers to capture and at least temporarily retain the radially extending flange of the split sleeve, the third shaft having a passageway sized to receive the second shaft.

14. The puller tool of claim 13 wherein the opening in the workpiece is an opening in a bushing, the bushing being received by an opening in a structural member.

15. A cooperating shaft assembly for use with a puller tool to radially expand a split sleeve within an opening in a work piece, the assembly comprising:

a first shaft having a passageway and radially inwardly projecting clamp jaws that are selectively deformable to form a radially expandable open end;

a second shaft at least partially received by the first shaft, the second shaft having a first inner perimeter and a second inner perimeter, the first inner perimeter larger than the second inner perimeter, a detent region formed between an end of the second shaft and a transition region where the first inner perimeter transitions into the second inner perimeter;

a third shaft having an outer perimeter and at least one tapered, radially extending protuberance located on the outer perimeter of the third shaft, the third shaft at least partially received by the second shaft and axially translatable with respect to the second shaft into a first position and a second position, the second position spaced from the first position, wherein in the first position the at least one protuberance engagably interacts with the second inner perimeter of the second shaft to permit radial expansion of the clamp jaws of the first shaft, and in the second position the at least one protuberance is located along the detent region of the second shaft to allow a radial contraction of the clamp jaws of the first shaft; and a mandrel axially coupled with the puller tool and axially moveable through the passageway of the first shaft, the mandrel having a cold working portion sized to radially expand the split sleeve.

16. The assembly of claim 15 wherein the first inner perimeter of the second shaft is circular.

17. The assembly of claim 15 wherein the first inner perimeter of the second shaft is non-circular.

18. The assembly of claim 15 wherein the passageway of the first shaft is sized to be larger than the cold working portion of the mandrel.

* * * * *